United States Patent
Ariza et al.

(10) Patent No.: US 8,722,125 B2
(45) Date of Patent: May 13, 2014

(54) APPARATUS AND METHOD FOR DEMUCILATING, CLEANING AND WASHING DEPULPED COFFEE

(75) Inventors: Elias Ariza, Bogotá (CO); Alvaro Ardila Duarte, Bogotá (CO)

(73) Assignees: Penagos Hermanos y Cia. Ltda, Bogotá (CO); Alvaro Ardila Duarte, Bogotá (CO)

(*) Notice: Subject to any disclaimer, the term of this patent is extended or adjusted under 35 U.S.C. 154(b) by 0 days.

(21) Appl. No.: 13/578,455

(22) PCT Filed: Feb. 10, 2011

(86) PCT No.: PCT/IB2011/050556
§ 371 (c)(1),
(2), (4) Date: Aug. 10, 2012

(87) PCT Pub. No.: WO2011/098964
PCT Pub. Date: Aug. 18, 2011

(65) Prior Publication Data
US 2012/0328751 A1 Dec. 27, 2012

(30) Foreign Application Priority Data
Feb. 11, 2010 (BR) ..................................... 1002198

(51) Int. Cl.
*A23F 5/16* (2006.01)
(52) U.S. Cl.
USPC ................................ 426/483; 99/623; 99/536
(58) Field of Classification Search
USPC .................................. 426/483; 99/623, 536
See application file for complete search history.

(56) References Cited

U.S. PATENT DOCUMENTS

| 1,066,344 A | 7/1913 | Urgelles |
| 2,261,560 A | 11/1941 | Pellas et al. |

(Continued)

FOREIGN PATENT DOCUMENTS

| BE | 445.608 | | 6/1942 |
| BE | 445608 | * | 6/1942 |

(Continued)

OTHER PUBLICATIONS

English Abstract for MX9603756 published Feb. 1998.*

(Continued)

*Primary Examiner* — Anthony Weier
(74) *Attorney, Agent, or Firm* — Merchant & Gould P.C.

(57) ABSTRACT

The present invention is developed in the farming machinery field used during the wet stage of the coffee and refers to an apparatus that allows carrying out the processes of demucilaging, cleaning and washing of the previously depulped coffee seedcases using a low water and power consumption. Said apparatus includes a mechanical feeding system for depulped beans, as well as a system for removing the mucilage and further washing of the beams that is constituted by a vertical rotor provided with metallic fingers that generate friction between the grains to be demucilaged, and also two metallic baskets, the first one is conical shaped—where a variable pressure zone between beans is generated, making possible a efficient detachment of the mucilage—, and the second one is cylindrical shaped one—zone of greater agitation between the beans and lower pressure between them and where a minimal amount of water is used for final washing—, which are built with square rods forming a continuous spiral which enables an easy evacuation of mucilage and other impurities through the horizontal slots due to the centrifugal force produced by the spin of a rotor. Finally, the present invention refers to a method for demucilaging, cleaning and washing depulped coffee by using of the above mentioned integral machine.

10 Claims, 2 Drawing Sheets

(56) References Cited

U.S. PATENT DOCUMENTS

Figure 1:
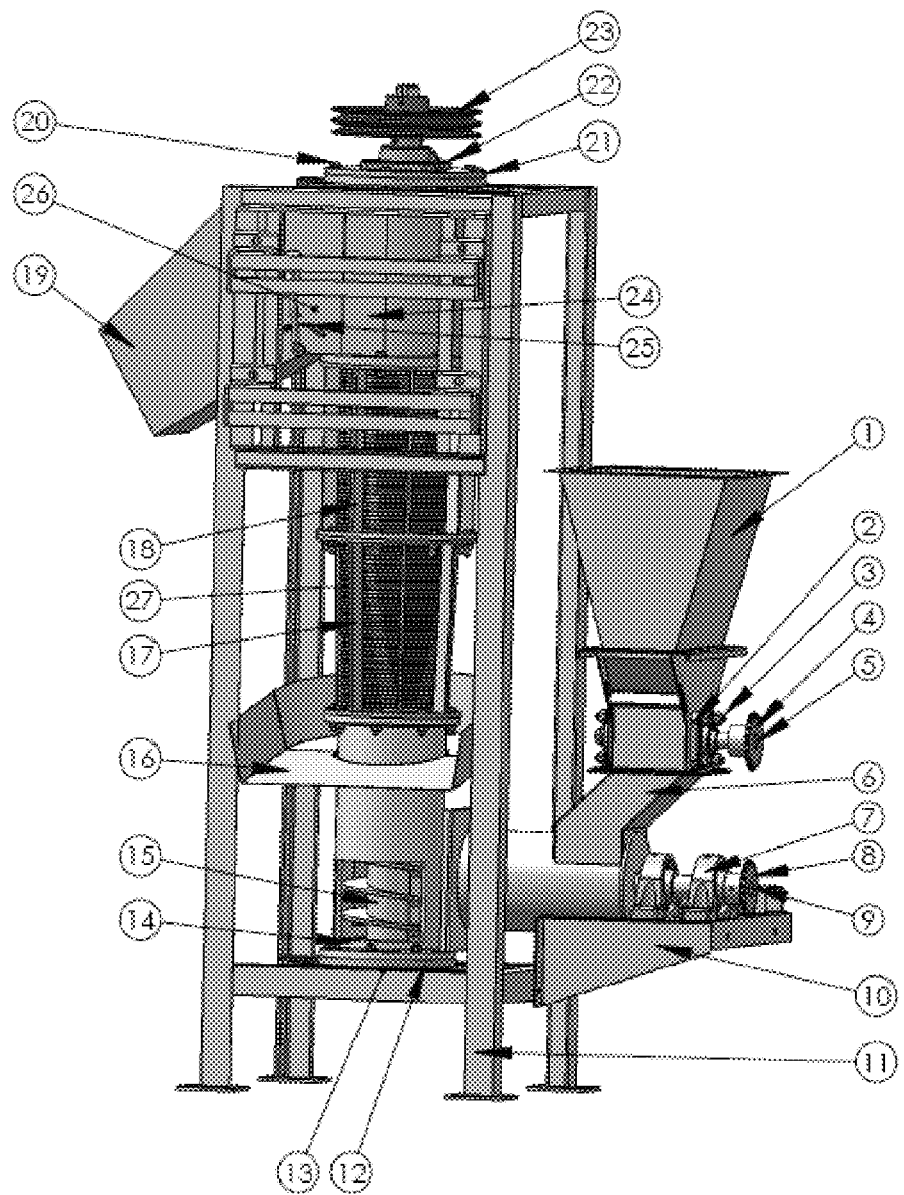

| | | | | |
|---|---|---|---|---|
| 2,704,255 | A | * | 3/1955 | Davies et al. ............... 426/655 |
| 3,139,919 | A | * | 7/1964 | Rivera ........................ 99/601 |
| 6,076,454 | A | * | 6/2000 | Hagon ........................ 99/519 |
| 7,754,263 | B2 | * | 7/2010 | Miljkovic et al. ............ 426/427 |
| 7,807,205 | B2 | * | 10/2010 | Miljkovic et al. ............ 426/425 |
| 7,887,862 | B2 | * | 2/2011 | Paz Briz et al. ............. 426/18 |
| 2011/0262607 | A1 | * | 10/2011 | Ardila Duarte et al. ...... 426/482 |

FOREIGN PATENT DOCUMENTS

| | | | |
|---|---|---|---|
| BR | PI 9601856-9 A | | 9/1998 |
| BR | 2005027892 | * | 3/2007 |
| CO | 95 031.257 | | 11/1999 |
| GB | 208415 | | 12/1923 |
| MX | 9603756 | * | 2/1998 |
| WO | WO 97/18721 | | 5/1997 |
| WO | WO 9718721 | * | 5/1997 |

OTHER PUBLICATIONS

English Abstract for BR2005027892 published Mar. 2007.*
English Translation for the Specification of BE445608 published Jun. 1942.*
Edward T. Fukunaga, "A New Mechanical Coffee Demucilaging Machine", *Hawaii Agricultural Experiment Station, Culletin 115*, 1957, pp. 1-18.
International Search Report from International Application No. PCT/IB2011/050556 mailed Jul. 21, 2011.

* cited by examiner

APPARATUS AND METHOD FOR DEMUCILATING, CLEANING AND WASHING DEPULPED COFFEE

This application is a National Stage Application of PCT/IB2011/050556, filed 10 Feb. 2011, which claims benefit of Ser. No. 1002198-1, filed 11 Feb. 2010 in Brazil and which applications are incorporated herein by reference. To the extent appropriate, a claim of priority is made to each of the above disclosed applications.

TECHNICAL BACKGROUND

The wet stage of the coffee is one of the most used processes for coffee growers to carry out the transformation of the cherry coffee into dry parchment, since it enables the obtainment of a bean of high physical quality. Said process comprises basically the following steps: 1) selective or non selective coffee harvesting, 2) classification of the coffee into cherry, 3) depulping, 4) demucilaging process, 5) washing, and 6) drying.

Demucilaging is a process by means of which it is eliminated the mucilage coating the endocarp or parchment of the bean and that is exposed after carrying out the depulping process. Said mucilage is highly hygroscopic and pectin rich, and for this reason its presence is an obstacle for drying and preserving the beans.

The processes currently known for removing mucilage from coffee beans include biochemical demucilaging, chemical demucilaging and mechanical demucilaging.

Biochemical or fermentation actions are based on the solubilization of the mucilage due to decomposition of pectins through soluble ferments or diastases that normally exist in the mature coffee and that act as catalysts able to solubilize all the pectin material. In addition, microbial fermentation indirectly exerts a favorable action on mucilage solubilization because it is generally accompanied by an increase in the temperature, fact that increases the diastases action.

Unfortunately, the demucilaging methods made by fermentation of the depulped bean are related to high costs on the ecological level—due to the use of abundant water in the process, which is further poured into rivers—, and on the economical level,—since the fermentation process reduces the weight and quality of the bean—.

On the other hand, chemical demucilaging comprises the use of products such as sodium, potassium or calcium hydroxide, which properly dosed are applied to depulped coffee stacks to carry out a process of alkaline hydrolysis. However, coffee undergoing chemical demucilage is characterized by being less acid compared to those treated through natural fermentation.

Now, mechanical demucilage implies detachment of mucilage basically as a consequence of friction between beans or high pressure water application. Therefore, for example, in the state of the art, some processes where mucilage is detached through friction caused by mixing depulped coffee with sand or sawdust are known (Urgelles, 1912), and also devices using big amounts of pressurized water as a mechanism for demucilaging depulped coffee beans, are known (Pellas and Kraunt, 1941).

On the other hand, researchers of the Agricultural Experiment Station in Hawaii have considered mechanical demucilage from 1953. Specifically, during 1957 they published an article[1] where they described a demucilaging apparatus consisting essentially of a U shaped tube and a series of internal vanes, that functions considering that the specific weight of depulped coffee is slightly superior to that of water and therefore the water flow inside said tube drags coffee, as long as the flow speed is not excessively slow.

[1]Fukunaga, E. T.; A new mechanical coffee demucilaging machine; Bulletin—Hawaii Agricultural Experiment Station (EUA); December 1957 (No 115) 18 p.

According to what is disclosed by Fukunaga et al., once the vanes are functioning, the freshly depulped coffee starts to tack on the feeding tube together with a carefully regulated water flow, in a manner that when the coffee level rises in the feeding tube, also rises in the mixing tube (communicating vessels principle) and while the coffee mass flows through the entire tube, mucilage is detached from the almond by fast rotation of the vanes. Finally, demucilaged coffee is poured by the exit hopper and is conducted to a vibrating sieve to wash demucilaged coffee almonds through the application of clean water.

Now, in the state of the art demucilaging machines are known, as the one disclosed by Álvaro Ardila Duarte[2] in 1995, which is constituted by four systems or subsets working simultaneously and progressively in vertical position to seize gravity force during the mucilage separation process.

[2]Vertical demucilaging and washing machine for coffee; Invention Patent granted to Álvaro Ardila Duarte. Filing date: Jul. 14, 1995.

Said machine comprises a vertical rotor having in the middle part some steel extensions or fingers, which coincide with the position of the polygonal basket that is part of the demucilating machine, and by rotation they generate shear and tension forces that provoke the separation of mucilage and impurities from coffee beans. Sides and edges of the rods forming the polygon of the polygonal basket avoid that the coffee mass spins at the same speed that one of the vertical rotor, while the pressure and compression forces that the coffee beans undergo because of the rotor and the vertical polygonal basket make that mucilage and impurities that are being detached from coffee are exiting by the vertical slots of the polygonal basket.

However, the mechanical design of the previously described demucilating machine does not allow to efficiently graduate the washing intensity of the beans, that is critical during coffee demucilaging because of the differences in the viscosity and adherence of mucilage to bean according to the coffee variety, the time between harvest and the percentage of mature coffee cherries treated. In addition, the vertical position of the rods forming the polygonal basket of said machine has demonstrated to be unsuitable for achieving an effective evacuation of mucilage and impurities that are detached from the coffee grains, while the geometry and disposition of the metallic basket do not allow efficient removal of mucilage.

On the other hand, on 1996 Adelcio Piagentini[3] disclosed a demucilaging machine constituted by a cylinder located in vertical or slanting position with an inner grid forming a chamber wherein a rotor is spinning with it in a concentric manner, said rotor located in the lower part—which is the feeding area of the machine—a helix causing the ascending movement of the product generating compression between the beans due to the own weight of the product accumulated at the final part of the rotor as a consequence of the vertical or slanting position of the shaft of the apparatus. The water radially injected, along with the stirring induced by the tabs at the final part of the rotor causes the removal and washing of mucilage from the beans that leave the upper part of the cylinder and are already demucilaged.

[3]Ecological vertical demucilaging machine with ascending flow; Adelcio Piagentini; Invention Patent; Filing date: Jun. 20, 1996

Unfortunately, said equipment uses a grid of perforated foil for the exit of the mucilage and impurities, which is inefficient because of the multiple blockages that said arrangement generates. Likewise, the design of the demucilating machine disclosed by Piagentini does not enable the adjustment of the washing intensity of the coffee beans, while the geometry and arrangement of the metal basket do not allow achieving an efficient removal of mucilage.

Because of the above, it is absolutely clear that there is still a need for designing demucilating machines that allow overcoming the technical obstacles shown by the apparatus that is part of the current state of the art, and that therefore allow carrying out a demucilaging, cleaning and washing process for the depulped coffee beans in an efficient manner, that is to say, with a lower use of water and power.

BASIC FEATURES OF THE INVENTION

Now, taking into account the teachings of the prior art and based on the functioning of the different mechanical demucilating machines known to date, the applicant of the present invention considered that and efficient and novel manner of carrying out the demucilaging and washing process of depulped coffee is through a system involving carrying out progressive gradual stages, wherein each stage involves a specific mechanical disposition of the demucilating machine and allows carrying out a part of the process for demucilating, cleaning and washing the coffee beans, as it is described below:

First Stage: Dosing and mechanical feeding of the depulped coffee, which consists of the mechanical and controlled introduction of freshly depulped coffee to the demucilating machine by means of two endless screws, wherein the first of them—located horizontally—receives because of the gravity the depulped coffee beans and using pressure introduces them into a frame comprising the second endless screw, which is vertically arranged and rigidly attached to the vertical rotor of the demucilating machine.

Second Stage: Mucilage detachment, which is achieved as a consequence of the shear stress produced on the coffee beans by the rotational movement of the metallic fingers located in the vertical rotor of the demucilating machine, which are in contact with the coffee beans that are gradually ascending by means of the endless screw vertically located (rotor helix), and therefore exert pressure and originate friction movements that finally break the mucilage film present in the surface of the coffee beans.

Said mucilage detachment occurs in a gradual and progressive manner due to the conical geometry of the basket, since in the lower part of said conical basket (zone with a smaller cross section) a high pressure between the coffee beans and a low speed between them are generated, but as they are ascending the pressure between them decreases and the speed increases. Said arrangement allows in a surprising manner achieving an efficient detachment of the mucilage with low power consumption.

Third Stage: Separation of mucilage and impurities, where, because of the centrifugal force occasioned by the rotor spin, the evacuation of the mucilage and the impurities detaching from the coffee beans is performed through the free spaces that exist between the rods of the conical basket, which is built with squared rods forming a continuous spiral and that are separated with a constant step. This novel arrangement of the rods forming the basket of the demucilating machine is more efficient compared to the design of the apparatus built with vertical rods of perforated foil that are described in the prior art, given that the absence of vertical obstacles allows a faster evacuation of the mucilage and the impurities detaching from the processed coffee beans, also preventing the existence of possible blockage zones.

Fourth Stage: Washing of the coffee beans, which occur in the cylindrical metallic basket built with square rods forming a continuous spiral. The modification in the geometry of said basket allows increasing the agitation of the coffee beans and reducing the pressure between them, avoiding the generation of possible physical damages in the outer layer of the coffee beans that are no longer coated with mucilage. This stage includes the application of a minimum amount of water that allows cleaning the demucilaged coffee beans and consequently leaves them ready for further processes, typical of the wet stage.

Fifth Stage: Graduation of the processes for demucilaging, washing and cleaning the beans, which is achieved through a metallic gateway that is located at the mouth of the exit of the coffee and depending on its position allows increasing or reducing the amount of coffee that is inside the machine, and therefore allows graduating the pressure between the beans. Said stage is very important, taking into account that the amount of mucilage and its adherence to the beans changes depending on the coffee variety (Bourbon, Caturra, Typical, etc), the climatic effects, and the time of harvesting (beginning of harvesting, peak of harvesting and end of harvesting), reason why it is necessary to regulate the internal pressure forces to which beans are subjected inside the machine.

DETAILED DESCRIPTION OF THE INVENTION

Figure 2:
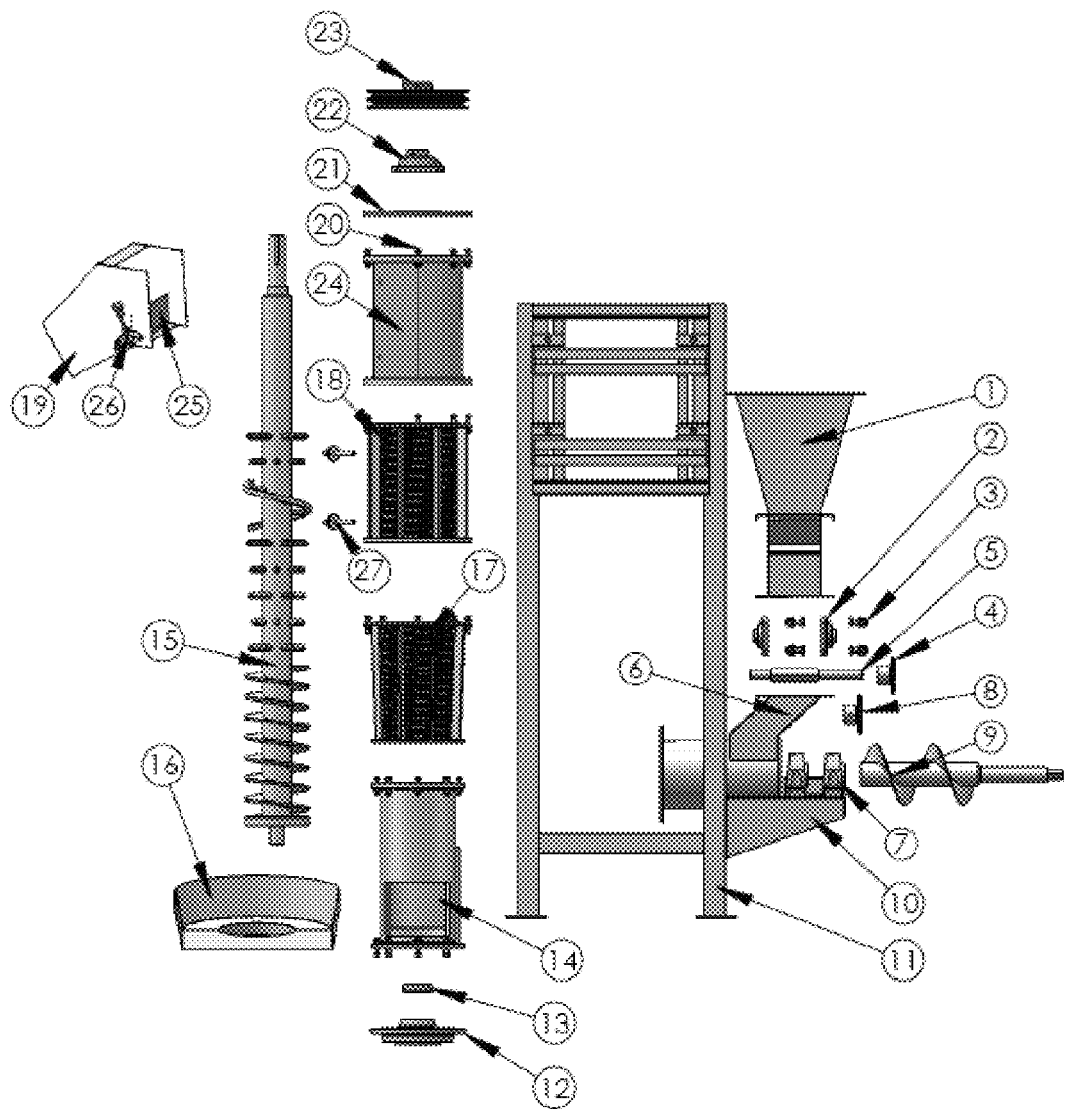

In addition to the outlined above, the object of the present application and the surprising technical advantages achieved by the inventor will be appreciated in detail through the following description of the structure and functioning of the demucilating, cleaning and washing, vertically ascending multistage double basket machine for depulped coffee, referring to the accompanying drawings, wherein:

FIG. 1 is a general view of the demucilating, cleaning and washing, vertically ascending multistage double basket machine for depulped coffee of the present invention; and FIG. 2 is a schematic view of the parts forming the demucilating, cleaning and washing, vertically ascending multistage double basket machine for depulped coffee of the present invention.

Now, in connection with FIG. 1, the receiving hopper 1 is supported in the body of the feeder 6 and it has a dosing shaft 5 with a square section supported by two bearings 2 that are tied to the hopper 1 by screws 3, while the pinion 4 commands the dosing shaft 5. The whole set of parts 1, 2, 3, 4 and 5 form the dosing system of depulped coffee that enters the demucilating machine.

On the other hand, the body 6, which is supported in the structure 11 by the base 10 and the frame 14, houses inside a horizontal endless feeder screw 9 that is supported by two bearings 7, which are fixed to the base 10 by screws 3. The pinion 8 commands the endless screw feeder 9, while said pinion 8 as well as pinion 4 are commanded by a chain of an external gearbox. Pieces 6, 7, 8 and 9 form the horizontal feeding system for depulped coffee.

Likewise, the frame 14 that is supported by the structure 11 through screws 20, is attached in its lower part to the roll-carrying plate 12, which also carries the roll 13, while in its upper part is attached to the conical basket 17 by means of screws 20. The tray 16 is a vessel attached to the external part of the frame 14.

The cylindrical basket 18 is attached in its lower part to the conical basket 17 and in its upper part to the head assembly 24, in both cases through screws 20. Said cylindrical basket 18 has two injector-carrying bushings, wherein the two injectors 27 introduce water into the basket. The head assembly 24 is attached to the structure 11 in its upper part through screws 20 and the bearing carrier plate 21 is attached, which carries the bearing 22.

The output channel 19 is supported on the head assembly 24 and has a gateway 25 for graduating the washing, which spins on bushings 26 welded to the output channel 19.

Finally, the rotor 15 comprises a spiral vertical thread, metallic fingers, an intermediate helix and two shaft ends supported on the roll 13 and the bearing 22. All these elements are rigidly attached to a central tube. Said rotor 15 is commanded by the pulley 23, which is in turn commanded by straps of a motor.

In a preferred embodiment of the invention, the conical basket 17 is attached to the cylindrical basket 18 by means of screws, rivets, adhesives, welding or any other material or process allowing a stable fixation between both baskets.

In another preferred embodiment of the invention, the conical basket 17 has a lean angle relative to the vertical axis between 1° and 45°, more preferably between 1° and 15°.

In another embodiment of the invention, all the parts forming the demucilating machine herein disclosed can be manufactured in metal, plastic or any other synthetic material providing suitable stability to the machine.

Now, regarding the functioning mechanism of the demucilating machine of the present invention and referring to Figures A and B of the application, the previously depulped coffee without water enters the hopper 1 wherein the dosing shaft 5, spinning due to pinion 4, allows a regulated passage of depulped coffee to the endless feeder screw 9, which, spinning due to pinion 8, mechanically introduces said coffee beans to frame 14, from where the rotor helix 15 spins and raises the coffee vertically until it is introduced in the conical basket 17.

The metallic fingers of rotor 15 propel the coffee by making it spin and produce a friction effect between the beans, which generates detachment of mucilage and impurities adhered thereto. Because of the centrifugal force and the internal pressure inside the conical basket 17, mucilage and impurities that are being detached pass through the horizontal spaces created by the square rods in the form of a continuous spiral and fall in tray 16, which carries them out of the apparatus. In addition, as a consequence of the cross section of the conical basket 17, as the coffee beans rise and mucilage is detached, the pressure on them decreases, which avoids physical damages in the almond layer called parchment, and at the same time decreases the torque needed to move the mass, thereby achieving a reduction in the required power.

The partially demucilaged coffee mass continues in ascending movement and passes from the conical basket 17 to the cylindrical basket 18 helped by the intermediate helix of the rotor 15. In said cylindrical basket 18 water is injected through the injectors 27, with the purpose of cleaning the bean leaving it clean.

The internal pressure achieved within the cylindrical basket 18 can be adjusted through the gateway 25, which eventually allows to retain the coffee mass to achieve different washing levels for the grains. This fact is very important when it is taken into account that there are different types of coffee beans, each of which is characterized by having mucilage with a determined viscosity and adherence to the bean depending on the variety, the time between harvesting and the percentage of mature berries in the depulped coffee. The water that is injected and mixed with the mucilage and the remaining impurities also passes through the slots of the cylindrical basket 18 and falls into the tray 16 to be finally driven out of the apparatus.

Finally, the coffee bean without mucilage and without impurities leaves the apparatus by the output channel 19 for the further drying process.

This integral machine can be built in different sizes and capacities and can be operated with any type of engine, whether electrical or of internal combustion.

COMPARATIVE EXAMPLE

In order to evaluate the performance and the technical advantages of the demucilaging, cleaning and washing machine for depulped coffee beans according to the present invention over the machines and processes known in the prior art, experimental tests designed to measure water and power consumption for each case were performed.

To this purpose, 3000 kilograms of coffee cherries of a single variety and collected the same day of the test were depulped and then divided into three equal parts for then be treated as follows:

The first part was deposited in a tank for 24 hours to promote the natural mucilage fermentation process. Subsequently, the coffee was washed measuring the amount of water required for that purpose. Said process was made manually.

The second part of the depulped coffee was processed in a vertical ascending demucilating machine built according to the teachings of the prior art. During said process, the consumption of power and water required to obtain a complete washing and demucilaging was measured.

The third part of the depulped coffee was processed in a demucilating, cleaning and washing, vertical ascending multistage double basket machine for depulped coffee according to the present invention. During said process the consumption of power and water required to obtain a complete washing and demucilaging was measured.

The previously described test was repeated several times and the average of the results obtained are summarized in the following comparative table:

|  | Water consumption in liters per kilogram of processed depulped coffee | Power consumption in watts per kilogram of processed depulped coffee |
| --- | --- | --- |
| Demucilaging by natural fermentation | 6 liters | Manual |
| Mechanical demucilaging made by machines of the prior art | 0.33 liters | 2.5 watts |
| Mechanical demucilaging made by the machine disclosed in the present application | 0.16 liters | 1.25 watts |

From the above, it is clear that the amounts of water and power required for demucilaging, washing and cleaning the coffee beans using the novel machine disclosed in the present application are lower than the amounts required for carrying out the same process using the machines known in the prior art, reason why it is evident that said novel demucilating machine represents a significant advance in the state of the art. Description of the Parts of the Demucilating, Cleaning, Washing Vertical Ascending Multistage Double Basket Machine for Depulped Coffee 1. Dosing hopper, stores the depulped coffee
2. flange bearing that supports the dosing shaft 3. screws with nut and spring plain washer holding the bearings
4. chain pinion that commands the dosing shaft
5. dosing shaft that regulates the amount of coffee entering into the horizontal feeding system
6. body of the horizontal feeding system
7. pedestal bearings supporting the endless feeder
8. chain pinion commanding the endless feeder
9. endless screw feeder introducing mechanically the depulped coffee in the frame
10. base that supports the bearings 7 and the gearbox
11. metal structure that supports all the components
12. roll carrier plate that carries a roll
13. roll
14. tubular piece frame that together with the rotor helix form the vertical feeding system
15. rotor, consisting of a metal tube to which an endless helix has been attached, which carries out the vertical feeder function, metal fingers that generate the impulse to the coffee beans, an intermediate helix that aids the ascending flow of the grain and shaft tips to provide support
16. tray, container used to receive and drive the mucilage and impurities out of the apparatus
17. conical basket, built in square metal rods separated from one another to allow the exit of mucilage and impurities of the demucilaged coffee, is of conical cross-section
18. cylindrical basket, built in square metal rods separated from one another to allow the exit of mucilage and impurities of the demucilaged coffee, is of cylindrical cross section. The injector carrying bushings are welded to it.
19. output channel that leads the demucilaged coffee out of the machine and also has a gateway for washing graduation
20. screws with nuts and spring plain washers for attaching the elements of the machine
21. bearing carrier plate that carries the bearing
22. bearing
23. trapezoidal channel pulley, for commanding the rotor
24. head assembly, tubular piece that leads the coffee from the cylindrical basket to the output channel
25. gateway for washing graduation
26. bushings for supporting the gateway for washing graduation
27. water injectors that introduce water into the cylindrical basket

What is claimed is:

1. An apparatus for demucilating, cleaning and washing depulped coffee, comprising:
   a) a main structure for housing the apparatus;
   b) a dosing system comprising:
      a receiving hopper;
      a dosing shaft connected to the receiving hopper by bearings wherein said dosing shaft is driven by a first set of pinions and chains;
   c) a depulped coffee feeding system connected to the dosing system, wherein the depulped coffee feeding system comprises:
      a feeder body;
      an endless screw horizontally arranged and attached to the feeder body by bearings and screws, wherein said endless screw is driven by a second set of pinions and chains;
   d) a rotor, housed in the main structure, having a central tube, wherein the central tube is rigidly attached to a vertical spiral thread, metal fingers, an intermediate helix, and two shaft ends supported by rolls and bearings;
   e) a pulley attached to a first shaft end of the central tube;
   f) a collection tray, attached to the main structure, for collecting mucilage and impurities;
   g) a conical lower basket and a cylindrical upper basket constructed with square rods that form a continuous spiral, wherein each of the conical lower basket and the cylindrical upper basket are operatively connected to the central tube; and
   h) an output channel, attached to the main structure, for transferring the depulped coffee.

2. The apparatus for demucilating, cleaning and washing depulped coffee, according to claim 1, which additionally includes a frame having a lower part, an upper part, and an outer part, wherein the frame is supported by the main structure, and wherein said frame is attached in its lower part to a roll carrying plate, in its upper part to the conical lower basket and in its outer part to the collection tray.

3. The apparatus for demucilating, cleaning and washing depulped coffee, according to claim 1, wherein the conical lower basket is attached to the cylindrical upper basket by means of screws, rivets, adhesives, welding or any other material or process that allows a firm attachment between each basket.

4. The apparatus for demucilating, cleaning and washing depulped coffee, according to claim 1, wherein the cylindrical upper basket comprises injector carrying bushings and injectors for introducing water into the basket.

5. The apparatus for demucilating, cleaning and washing depulped coffee, according to claim 1, wherein the output channel further includes:
   bushings welded to said output channel; and
   a door that rotates on the bushings.

6. The apparatus for demucilating, cleaning and washing depulped coffee, according to claim 1, which further comprises:
   a head assembly that supports the output channel;
   a frame having a lower part, an upper part, and an outer part, wherein the frame is supported by the main structure, and wherein said frame is attached in its lower part to a roll carrying plate, in its upper part to the conical lower basket and in its outer part to the collection tray; and
   wherein said head assembly is attached in its upper part to the main structure and in its lower part to the cylindrical upper basket.

7. The apparatus for demucilating, cleaning and washing depulped coffee, according to claim 1, wherein the receiving hopper is a truncated pyramid-shaped and is comprised of foil or plastic.

8. The apparatus for demucilating, cleaning and washing depulped coffee beans, according to claim 1, wherein an electrical or internal combustion engine is used.

9. A process for demucilaging, cleaning and washing depulped coffee beans using an apparatus, wherein the process comprises:
   a) transferring the depulped coffee beans having mucilage and impurities adhered to them to a receiving hopper in which a dosing shaft that rotates by means of pinions enables a regulated passage for the depulped coffee beans to an endless screw arranged horizontally, which also rotates by means of pinions, wherein the endless screw introduces the depulped coffee beans to a frame including a vertical rotor having metal fingers and a helix that lifts the depulped coffee beans into a conical basket;

b) driving the depulped coffee beans through the conical basket using the metal fingers of the vertical rotor, by turning the metal fingers and producing a friction effect between the depulped coffee beans which detaches the mucilage and impurities adhered to the depulped coffee beans, thereby generating demucilaged coffee beans, which thereafter pass through horizontal spaces created by square rods, having a shape of a continuous spiral, and fall into a tray for exiting the apparatus;

c) passing the demucilaged coffee beans in ascendant movement from the conical basket to a cylindrical basket aided by an intermediate helix of the vertical rotor, to a site at which water is injected through one or more injectors to rinse and clean the demucilaged coffee beans;

d) passing the water injected and mixed with the mucilage and impurities through horizontal slots of the cylindrical basket and into the tray to be taken out of the apparatus; and e) exiting clean, coffee beans without mucilage and without impurities through an output channel of the apparatus.

10. The apparatus for demucilating, cleaning and washing depulped coffee, according to claim 1, using any variety of coffee beans.

\* \* \* \* \*